United States Patent [19]

Sielfeld

[11] Patent Number: 4,472,561
[45] Date of Patent: Sep. 18, 1984

[54] PROCESS FOR THE PRODUCTION OF POLYMERS AND COPOLYMERS OF VINYL CHLORIDE BY SUSPENSION POLYMERIZATION AND THEIR USE AS VISCOSITY REDUCING AGENTS IN PLASTISOL PROCESSING

[75] Inventor: Gilbert Sielfeld, Marl, Fed. Rep. of Germany

[73] Assignee: Chemische Werke Huels, AG, Marl, Fed. Rep. of Germany

[21] Appl. No.: 495,029

[22] Filed: May 16, 1983

[30] Foreign Application Priority Data

May 14, 1982 [DE] Fed. Rep. of Germany ....... 3218173

[51] Int. Cl.$^3$ .............................................. C08F 2/20
[52] U.S. Cl. .................................... 526/201; 524/458
[58] Field of Search ......................... 526/201; 524/458

[56] References Cited

U.S. PATENT DOCUMENTS

| | | | |
|---|---|---|---|
| 3,966,696 | 6/1976 | Kidoh | 526/201 |
| 4,035,563 | 7/1977 | Tachibana | 526/201 |
| 4,145,499 | 3/1979 | Nagano | 526/201 |
| 4,345,056 | 8/1982 | Thyret | 526/201 |
| 4,356,283 | 10/1982 | Weinlich et al. | 524/504 |

Primary Examiner—Paul R. Michl
Attorney, Agent, or Firm—Millen & White

[57] ABSTRACT

Production of suspension polyvinyl chloride suitable for reducing the viscosity of polyvinyl chloride plastisols is effected by suspension polymerization in the presence of small amounts of (a) an ethylene/propylene/ethylidene norbornene terpolymer having a propylene content of 40–50% by weight, with 5–15 double bonds per 1,000 carbon atoms and with a viscosity of 4–20 mPa s, measured with 2% solutions in trichloroethylene at 25° C.;

and/or (b) a polyvinyl isobutyl ether having a K value of 80–150, measured with 0.5% solutions in isooctane at 20° C., wherein the catalysts, the ethylene/propylene/ethylidene norbornene terpolymer and/or the polyvinyl isobutyl ether and the monomer or comonomer mixture are added to the polymerization batch before adding the suspension agent or the suspension agent mixture. These suspension polymers are used as additives for polyvinyl chloride plastisols.

16 Claims, No Drawings

PROCESS FOR THE PRODUCTION OF POLYMERS AND COPOLYMERS OF VINYL CHLORIDE BY SUSPENSION POLYMERIZATION AND THEIR USE AS VISCOSITY REDUCING AGENTS IN PLASTISOL PROCESSING

BACKGROUND OF THE INVENTION

The present invention relates to the production of a fine-grained vinyl chloride suspension polymer and its use as a viscosity reducing agent (viscosity depressant) in polyvinyl chloride plastisol processing.

Polyvinyl chloride plastisols (polyvinyl chloride pastes) are generally understood to mean dispersions of fine polyvinyl chloride powders in plasticizers which have a not too strong swelling effect. Suitable paste-forming polyvinyl chloride grades for this use are emulsion polymers and, in particular, also microsuspension polymers. These are polyvinyl chloride products obtained in latex form after polymerization and processed generally by spray-drying into agglomerated secondary particles (plastisol grade). During plastisol processing, these agglomerates are predominantly decomposed into primary particles. The degree of such decomposition and the size distribution of the primary particles determine the flow properties of the paste.

Polyvinyl chloride pastes are utilized mainly as spread-coating pastes, as dipping and casting pastes, and as spray pastes for a great variety of finished articles.

In general, pastes having low viscosities are desirable for manufacturing finished articles having a low plasticizer content. It is known to lower the paste viscosity for this purpose by the addition of non-paste-forming, fine-grained suspension polyvinyl chloride products (so-called extender PVC) which are broken down only at the gelling temperature.

According to German Pat. No. 1,645,668, such suspension polymers for reducing the viscosity of polyvinyl chloride plastisols can be produced with the aid of methylhydroxypropylcelluloses, having a viscosity of 50–500 mPas in a 2% by weight solution at 20° C., as the sole suspension stabilizer and with the use of monomer soluble catalysts. As can be seen from Comparative Example A (according to German Pat. No. 1,645,668 with a methylhydroxypropylcellulose as the suspension stabilizer which, in a 2% by weight solution, exhibits a viscosity of 100 mPas at 20° C.), polymers produced in this way show, however, a considerable proportion of coarse grains having particle sizes above 100 μm. This leads to an undesired sedimentation of the coarse proportion and therefore causes difficulties during processing. Furthermore, the coarse proportion results in an undesirable, rough surface, especially when very thin coats are applied.

According to DOS No. 3,018,940, these disadvantages are overcome by the use of a quite specific vinyl chloride graft polymer as the extender polyvinyl chloride. This involves vinyl chloride graft polymers manufactured in the presence of oil-soluble initiators, a suspension stabilizer, an emulsifier, and an ethylene-vinyl acetate copolymer. As can be seen from Comparative Experiment C of DOS No. 3,018,940 and Comparative Experiment B of the present application (Table 1), the particle sizes required for use as extender polyvinyl chloride in plastisols are obtained by adding certain amounts of emulsifier and/or tenside during polymerization. On account of the resultant grain fineness, such products do not show a settling tendency and are suitable for the application of thin plastisol layers. However, there is an attendant grave disadvantage. As can be derived from the above-mentioned Comparative Example B in Table 1, the addition of the tenside leads to a drastic increase in grain porosity; as a result, it is hardly possible to obtain a reduction in paste viscosity using this product. To counteract this increased grain porosity, polymerization is carried out according to DOS No. 3,018,940 in the presence of an ethylene-vinyl acetate copolymer. In order to improve the paste viscosity level attained without emulsifier, relatively large quantities of ethylene-vinyl acetate copolymer become necessary, resulting in a pronounced reduction of the gelling capacity of the thus-prepared plastisols and in a markedly higher turbidity of the gelled plastisol layers. As can be seen from Comparative Experiments C and D according to DOS No. 3,018,940, a small amount of ethylene-vinyl acetate copolymer effects hardly any reduction in paste viscosity.

SUMMARY OF THE INVENTION

Accordingly, it is an object of this invention to provide a new process for preparing polyvinyl chloride polymers which meet the aforementioned requirements and which eliminate or ameliorate the foregoing disadvantages.

Upon further study of the specifications and appended claims, further objects and advantages of this invention will become apparent to those skilled in the art.

These objects have been achieved by providing a process for the production of finely particulate polyvinyl chloride polymers and copolymers in the absence of an emulsifier or tenside, by suspension polymerization in the presence of one or more suspension stabilizers, one or more oil-soluble catalysts, and optionally pH buffering systems, comprising, polymerizing in the presence of 0.4–5.0% by weight, based on the amount of monomer or monomer mixture, (a) of an ethylene/propylene/ethylidene norbornene terpolymer having a propylene content of 40–50% by weight, with 5–15 double bonds per 1,000 carbon atoms and with a viscosity of 4–20 mPas, measured on 2% solutions in trichloroethylene at 25° and/or (b) of a polyvinyl isobutyl ether having a K value of 80–150, measured on 0.5% solutions in isooctane at 20° C.;

and by adding the catalysts, the ethylene/propylene/ethylidene norbornene terpolymer and/or the polyvinyl isobutyl ether and the monomer or comonomer mixture to the polymerization batch before adding the suspension agent or suspension agent mixture.

DETAILED DISCUSSION

According to this invention, the catalyst, the polymers (a) and/or (b) to be used according to this invention, and the monomer or monomer mixture are added to the suspension water while the latter is free of suspension stabilizer, under agitation, optionally in the presence of pH buffer systems. Subsequently, agitation is preferably continued for some time, for example 10–60 minutes. Thereafter, to stabilize the polymerization batch, the suspension stabilizer is introduced under excess pressure (e.g., 0,5 bar above the pressure measured in the reactor), suitably in the form of an aqueous solution. The suspension stabilizers can advantageously be added in a 1-3% by weight aqueous solution with a feed rate of 10% by weight/minute to 1% by weight/minute of the suspension stabilizer is added prior to the start of polymerization. Polymerization is conducted essentially in the absence of emulsifiers.

Suitable polymers for use in accordance with this invention include polyvinyl isobutyl ethers having K values of 80-150, preferably 90-135, measured on 0.5% solutions in isooctane at 20° C. and/or ethylene-propylene-ethylidene norbornene terpolymers with 40-50% by weight, preferably 43-47% by weight of propylene content, having 5-15, preferably 6-14 double bonds per 1,000 carbon atoms and viscosities of 4-20 mPas, preferably 5.0-18 mPas, measured on 2% solutions in trichloroethylene at 25° C. Also usable are mixtures of the polymers (a) and (b) with ethylene-vinyl acetate copolymers comprising 38-55% by weight, preferably 42-48% by weight, of vinyl acetate and having a viscosity number of 95-210 ml/g, preferably 110-160 ml/g, measured in toluene in a concentration of 0.005 g/cc at 25° C. The relative amounts of (a) and (b) components and the mentioned copolymer are 1:99 to 99:1. The polymers and their mixtures are utilized in total quantities of 0.4-5% by weight, preferably 0.6-3% by weight, based on the total weight of monomer or monomer mixture.

The polyvinyl isobutyl ether mentioned above can be prepared fully conventionally, e.g., as disclosed in Thinius, Hochpolymere, Fachbuchverlag GmbH Leipzig, (1952), pages 190/191, whose disclosure is incorporated by reference herein. Moreover, the ethylene/propylene/ethylidene norbornene terpolymer can also be prepared fully conventionally as disclosed in GB Spezifikation No. 1 180 887 and German Offenlegungsschrift No. 15 95 695, whose disclosures are incorporated by reference herein. Ethylene/propylene/ethylidene norbornene terpolymers suitable for use in accordance with this invention are showing 40-50% by weight of propylene content, 35-55% by weight of ethylene content, and 5-10% by weight of ethylidene norbornene content.

Suitable catalysts include those which are oil-soluble and customarily employed in the suspension polymerization of vinyl chloride, such as diacyl peroxides, peroxydicarbonates, alkyl peresters, or azo compounds, for example diacetyl, didecanoyl, acetylbenzoyl, dilauroyl, dibenzoyl, di-tert-butyl peroxides, etc., azobisisobutyronitrile, and others. Initiators which are solid and show shelf stability at room temperature are particularly suitable for reasons of safety considerations. Examples of suitable, shelf-stable catalysts include lauroyl peroxide, bis(4-tert-butylcyclohexyl) peroxydicarbonate, dimyristyl peroxydicarbonate, dicetyl peroxydicarbonate, bis(2-methylbenzoyl) peroxide, etc. The catalysts can be utilized alone or in admixture, using conventional amounts of 0.01-0.3% by weight, preferably 0.01-0.2% by weight, based on the amount of the monomer.

Suspension stabilizers include the conventional and usually employed types of compounds, such as polyvinyl acetate, partially hydrolyzed polyvinyl acetate (polyvinyl alcohol), cellulose ethers, as described, for example, in the monograph by Kainer, "Polyvinylchlorid und Vinylchlorid-Mischpolymerisate" [Polyvinyl Chloride and Vinyl Chloride Copolymers], Springer Publishers, Berlin/Heidelberg/New York (1965), pp. 16 et seq., whose entire disclosure is incorporated by reference herein. Preferably suitable are the commercially available methylcelluloses with methoxy substitution degrees of 22-34% and viscosities of 10-5,000 mPas, preferably 10-100 mPas, measured in a 2% by weight aqueous solution (determined according to Brookfield at 20° C. and 20 rpm) and/or methylhydroxypropylcelluloses with methoxy substitution degrees of 20-32% and hydroxypropoxy substitution degrees of 2-9%, and with viscosities of 25-5,000, preferably 40-120 mPas, measured in a 2% by weight aqueous solution (Ubbelohde capillary viscometer) at 20° C. These are customarily employed in amounts of 0.05-1.5% by weight, preferably 0.1-1.0% by weight, based on the amount of the monomer.

Additional auxiliary agents for the polymerization which can optionally be employed are those which are conventional, e.g., pH buffer systems, such as ammonium salts, ammonia, alkali metal carbonates, etc.; chain regulators, e.g., aliphatic aldehydes, trichloroethylene, etc.; auxiliary agents against wall deposits; antioxidants, etc., all in conventional amounts. The polymerization can be conducted at the usual temperatures of 30° to 80° C., preferably 45°-75° C.

The use of up to 30% by weight of monomers polymerizable with vinyl chloride is possible for the production of copolymers. Examples for usable comonomers include vinyl esters, such as vinyl acetate, vinylidene halogenides, such as vinylidene chloride, acrylic acid and methacrylic acid alkyl esters of 1-18 carbon atoms in the alkyl residue, such as the methyl, n-butyl, and lauryl esters, esters of maleic acid, such as diethyl maleate and dipropyl maleate, and also monoolefins, such as ethylene or propylene.

The suspension polymers to be used in combination with paste-forming polyvinyl chloride grades are processed by the usual methods. The aqueous polyvinyl chloride suspension, degasified as is conventional, can first be dewatered in a centrifuge, the product optionally washed with pure water, and then fed to a flash dryer. If desired, a further drying step can be carried out in a drum dryer.

The extender polymers and copolymers prepared according to this invention can be utilized according to this invention as the viscosity reducing agent in mixtures with 95-45% by weight, preferably 95-50% by weight, of paste polyvinyl chloride.

Known emulsion or microsuspension polymers can be utilized as the polyvinyl chloride grades which can be made into a paste with plasticizer and other additives. The production of emulsion polyvinyl chloride is disclosed in the above-mentioned Kainer monograph, pages 34 et seq. The microsuspension polyvinyl chloride can be prepared by methods according to which the vinyl chloride, optionally together with other monomers, is homogenized, prior to heating to the polymerization temperature, in water containing ionic and optionally nonionic emulsifiers, to form a stable monomer dispersion, and the thus-obtained dispersion is conventionally polymerized with the aid of monomer-soluble polymerization catalysts. Processes based on this mode of operation are described, for example, in German Pat. Nos. 962,834 and 1,069,387, as well as in British Pat. No. 698,359.

The production of polyvinyl chloride pastes according to this invention is effected according to well known procedures and described in detail in the above-cited Kainer monograph, page 332, whose disclosure is incorporated by reference herein.

Unless indicated otherwise herein, the process of this invention is fully conventionally conducted, e.g., as disclosed in the above mentioned Kainer monograph, pages 111 et seq.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLE 1

A 40-liter polymerization reactor of stainless steel, equipped with impeller-type agitator and Pfaudler baffle was charged with the following ingredients: 15,500 parts of water, 10 parts of sodium carbonate, 3.4 parts of dicetyl peroxydicarbonate, 6 parts of dilauroyl peroxide, and 100 parts of an ethylene/propylene/ethylidene norbornene terpolymer with a propylene content of 45% by weight, 13 double bonds per 1,000 carbon atoms, and a viscosity of 10 mPas, measured with a 2% solution in trichloroethylene at 25° C. The reactor was sealed, purged with nitrogen, evacuated, then charged with 11,200 parts of vinyl chloride, and agitated for one hour at room temperature. Thereafter, 60 parts of a methylcellulose with a viscosity of 60 mPas, measured according to Brookfield (2% by weight aqueous solution at 20° C. and 20 rpm), and with a methoxy substitution degree of 28%, dissolved in 3,000 parts of water, was introduced at a feed rate of 0.66 part of methylcellulose per minute (50 parts of solution per minute). The reactor was heated to 60° C. and polymerization was conducted to a final pressure of 5 bar. The product, after degasification, was separated from the largest portion of water, rinsed with water, and dried at 50° C. in a fluidized bed dryer. As can be seen from Table 1, the thus-manufactured product has a very fine grain and a pronounced viscosity reducing effect in a blend with paste-forming polyvinyl chloride.

EXAMPLE 2

The method of Example 1 was employed, but using, in place of 60 parts of methylcellulose, 60 parts of a methylhydroxypropylcellulose having a methoxy content of 22.1% by weight, a hydroxy-propoxy substitution degree of 8.1% by weight, and a viscosity of 100 mPas (measured with an Ubbelohde capillary viscometer using a 2% by weight solution at 20° C.). As can be derived from Table 1, the thus-prepared product has a very fine grain and excellent viscosity reducing effect in a blend with paste-forming polyvinyl chloride.

EXAMPLE 3

The procedure of Example 1 was followed, but with the use, in place of 100 parts of ethylene/propylene/ethylidene norbornene terpolymer with 13 double bonds per 1,000 carbon atoms, of 100 parts of an ethylene/propylene/ethylidene norbornene terpolymer with 7 double bonds per 1,000 carbon atoms and a viscosity of 6.6 mPas, measured with a 2% solution in trichloroethylene at 25° C. As can be seen from Table 1, the thus-prepared product exhibits a very fine grain and excellent viscosity reducing effect in a blend with paste-forming polyvinyl chloride.

EXAMPLE 4

The process of Example 2 was utilized, but instead of 100 parts of ethylene/propylene/ethylidene norbornene terpolymer, only 50 parts was employed. As can be seen from Table 1, here again the product has a very fine grain and a pronounced viscosity reducing activity when blended with paste-forming polyvinyl chloride.

EXAMPLE 5

The process of Example 2 was employed, but using, instead of the ethylene/propylene/ethylidene norbornene terpolymer, 100 parts of a polyvinyl isobutyl ether having a K value of 130, measured with a 0.5% solution in isooctane at 20° C. As can be seen from Table 1, here again a very fine product is obtained having a marked viscosity reducing effect in a blend with paste-forming polyvinyl chloride.

EXAMPLE 6

The procedure of Example 1 was followed, but using a polyvinyl isobutyl ether having a K value of 130, measured with a 0.5% solution in isooctane at 20° C. As can be seen from Table 1, the thus-manufactured product has a very fine grain and exhibits a pronounced viscosity reducing property in a blend with paste-forming polyvinyl chloride.

EXAMPLE 7

The method of Example 6 was employed, but with 100 parts of a polyvinyl isobutyl ether having a K value of 100, measured with a 0.5% solution in isooctane at 20° C. As can be derived from Table 1, here again the product has a very fine grain and possesses a pronounced viscosity lowering activity in a mixture with paste-forming polyvinyl chloride.

Comparative Example A (in Accordance with German Pat. No. 1,645,668)

A 40-liter polymerization reactor of stainless steel, equipped with impeller-type agitator and Pfaudler baffle was charged with the following ingredients: 17,000 parts of water, 10 parts of sodium carbonate, 3.4 parts of dicetyl peroxydicarbonate, 6 parts of dilauroyl peroxide, and 60 parts of the methylhydroxypropylcellulose utilized in Example 2, but dissolved in 1,500 parts of water. The reactor was then sealed, purged with nitrogen, evacuated, charged with 11,200 parts of vinyl chloride, and stirred for one hour at room temperature. The reactor was then heated to 60° C. and polymerization was carried out to a final pressure of 5 bar. The product, after degasifying, was separated from the largest portion of the water, rinsed with pure water, and dried at 50° C. in a fluidized bed dryer. As can be seen from Table 1, the thus-prepared product has an undesirably high proportion of coarse grains of >100 μm.

EXAMPLE 8

The process was conducted as in Example 2, but using, instead of 60 parts of methylhydroxypropylcellulose having a viscosity of 100 mPas, 80 parts of a methylhydroxypropylcellulose with a methoxy substitution degree of 28.4% by weight, a hydroxy-propoxy substitution degree of 5% by weight, and a viscosity of 50 mPas (measured with an Ubbelohde capillary viscometer using a 2% by weight aqueous solution at 20° C.) and, instead of 100 parts of ethylene/propylene/ethylidene norbornene terpolymer, 100 parts of a polyvinyl isobutyl ether having a K value of 125, measured with a 0.5% solution in isooctane at 20° C. As can be derived from Table 1, the thus-manufactured product has a very fine grain and a marked viscosity reducing effect when blended with paste-forming polyvinyl chloride.

EXAMPLE 9

The procedure of Example 8 was followed, but using, in place of 80 parts of methylhydroxypropylcellulose, 60 parts of this compound and, instead of 100 parts of polyvinyl isobutyl ether, 100 parts of ethylene/propylene/ethylidene norbornene terpolymer with 45% by weight of propylene, having 7 double bonds per 1,000 carbon atoms and a viscosity of 16.2 mPas, measured with 2% by weight solutions in trichloroethylene at 25° C. As can be seen from Table 1, the thus-prepared product has a fine grain and a pronounced viscosity lowering effect with paste-forming polyvinyl chloride.

EXAMPLE 10

Example 1 was repeated, but with the use of 100 parts of an ethylene/propylene/ethylidene norbornene terpolymer having a propylene content of 45% by weight, with 13 double bonds per 1,000 carbon atoms and a viscosity of 5.8 mPas, measured with a 2% solution in trichloroethylene at 20° C. As can be derived from Table 1, the thus-produced material has a fine grain and a pronounced viscosity reducing effect in a blend with paste-forming polyvinyl chloride.

Comparative Example B

Comparative Example A was repeated, but using 40 parts of the methylhydroxypropylcellulose and 2.5 parts of sodium lauryl sulfate. As can be seen from Table 1, the thus-prepared product has a fine grain, but exhibits an inadequate viscosity reducing effect when blended with paste-forming polyvinyl chloride.

Comparative Example C (in Accordance with DOS No. 3,018,940)

Comparative Example B was repeated, but employing additionally 100 parts of an ethylene/vinyl acetate copolymer with 45% by weight of vinyl acetate and having a molecular weight of 39,000, measured by osmosis. As can be derived from Table 1, the thus-produced material has a fine grain, but shows inadequate viscosity reducing activity in the paste when blended with paste-forming polyvinyl chloride.

Comparative Example D (in Accordance with DOS No. 3,018,940)

The process of Comparative Example A was repeated, but using additionally 1 part of the sodium salt of a paraffin sulfonate having an average chain length of 5 to 15 carbon atoms. As can be seen from Table 1, the thus-prepared product has the desired, fine grain, but shows hardly any effect of reducing paste viscosity in a blend with paste-forming polyvinyl chloride.

TABLE 1

| | Grain Size Distribution Sieve Residue in % by Weight at Mesh Width | | | | Bulk Densi-tg (1) (g/l) | Plasticizer Absorption (2) g DOP / 100 g PVC | Paste Viscosity (3) in dPa s at Shear Rate in sec$^{-1}$ | | | | Tear Strength (4) (N/mm$^2$) | Elonga-tion at Rupture (%) |
|---|---|---|---|---|---|---|---|---|---|---|---|---|
| | 40 μm | 63 μm | 100 μm | 160 μm | | | 0.3 | 1 | 10 | 100 | | |
| Example 1 | 60 | 0.2 | 0.0 | 0.0 | 764 | 4.2 | — | 90 | 82 | 97 | 19.9 | 211 |
| Example 2 | 50 | 0.3 | 0.0 | 0.0 | 748 | 4.3 | 81 | 68 | 67 | 77 | 16.9 | 165 |
| Example 3 | 60 | 0.4 | 0.0 | 0.0 | 700 | 5.6 | 83 | 71 | 75 | 88 | — | — |
| Example 4 | 43 | 0.5 | 0.0 | 0.0 | 752 | 5.1 | 81 | 71 | 77 | 95 | 13.4 | 128 |
| Example 5 | 70 | 1.0 | 0.1 | — | 695 | 5.9 | 103 | 90 | 98 | 116 | 13.4 | 139 |
| Example 6 | 70 | 2.0 | 0.1 | — | 707 | 5.9 | 93 | 85 | 96 | 114 | 13.2 | 139 |
| Example 7 | 72 | 1.5 | 0.1 | 0.0 | 665 | 5.7 | 95 | 85 | 95 | 111 | 11.8 | 114 |
| Comp. Example A | 83 | 58 | 5.1 | 0.2 | 574 | 13.8 | 208 | 208 | 223 | — | 11.9 | 112 |
| Example 8 | 35 | 1.0 | 0.0 | 0.0 | 640 | 6.8 | 102 | 99 | 115 | 131 | 21.9 | 243 |
| Example 9 | 50 | 1.2 | 0.1 | 0.0 | 711 | 5.1 | 98 | 78 | 75 | 88 | 13.0 | 129 |
| Example 10 | 63 | 0.2 | — | — | 706 | 5.0 | 74 | 77 | 86 | 104 | 13.0 | 138 |
| Comp. Example B | 63 | 2.6 | 0.2 | — | 523 | 13.9 | 687 | 637 | 569 | 494 | 16.2 | 156 |
| Comp. Example C | 38 | 0.3 | — | — | 519 | 13.8 | 550 | 571 | 608 | 439 | 20.1 | 207 |
| Comp. Example D | 33 | 1.1 | 0.1 | — | 450 | 16.3 | 691 | 706 | 725 | 351 | 18.8 | 191 |

(1) According to DIN [German Industrial Standard] 53 468
(2) According to DIN 53 417/1 (Centrifuge Method)
(3) Paste formulation:
50 parts by weight of microsuspension polyvinyl chloride
50 parts by weight of polyvinyl chloride prepared as per invention
38 parts by weight of di-2-ethylhexyl phthalate
2 parts by weight of Ba/Cd/Zn stabilizer
Paste viscosity was measured in a "Rheomat" (company: Contraves) after a storage period of 24 hours.
(4) Gelling capacity of paste (after de-aeration) was measured on 1 mm pressed plates (gelling time of 1 minute at 170° C.) according to DIN 53 455 (tensile strength test). The tear strength values and the elongation at rupture values are values averaged from 7 measured data.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a vinyl chloride polymer comprising,
   suspension polymerizing a corresponding monomer or monomer mixture in the presence of a suspension stabilizer, an oil-soluble catalyst, an optional pH buffering system, and 0.4–5.0% by weight based on the weight of monomer
   (a) of an ethylene/propylene/ethylidene norbornene terpolymer having a propylene content of 40–50% by weight, 5–15 double bonds per 1,000 carbon atoms and a viscosity of 4–20 mPas, measured on a 2% solution in trichloroethylene at 25° C.; or (b) of a polyvinyl isobutyl ether having a K value of 80–150, measured on a 0.5% solution in isooctane at 20° C.;

wherein the catalyst, the ethylene/propylene/ethylidene norbornene terpolymer or the polyvinyl isobutyl ether and the monomers are added to the polymerization batch before addition of the suspension stabilizer thereto.

2. A process of claim 1 wherein a mixture of (a) and (b) are present during the polymerization.

3. A process of claim 1 wherein a buffer system is present during the polymerization.

4. A process of claim 1 wherein a mixture of suspension stabilizers and a mixture of oil-soluble catalysts are present during the polymerization.

5. A process of claim 1 wherein the vinyl chloride polymer is a homopolymer.

6. A process of claim 1 wherein the monomer component comprises an amount up to 30% by weight of a copolymer which is a vinyl ester, a vinylidene halogenide, a $C_{1-18}$-alkyl ester of acrylic or methacrylic acid, an alkyl ester of maleic acid or a monoolefin.

7. A process of claim 1, comprising polymerizing in the presence of 0.5–3.0% by weight of the ethylene/propylene/ethylidene norbornene terpolymer or polyvinyl isobutyl ether.

8. A process of claim 1 comprising polymerizing in the presence of an ethylene/propylene/ethylidene norbornene terpolymer having a propylene content of 43–47% by weight.

9. A process of claim 1 comprising polymerizing in the presence of component (a) having a double bond content per 1,000 carbon atoms of 6–14.

10. A process of claim 1 comprising polymerizing in the presence of component (a) having a viscosity of 5–18 mPas, measured on a 2% by weight solution in trichloroethylene at 25° C.

11. A process of claim 1 comprising polymerizing in the presence of component (b), having a K value of 90–135, measured on a 0.5% solution in isooctane at 20° C.

12. A process of claim 1 wherein the polymerization is conducted in the presence of an ethylene/vinyl acetate copolymer having a vinyl acetate content of 38–55% by weight and a viscosity number of 95–210 ml/g measured in toluene in a concentration of 0.005 g/cc at 25° C., the weight ratio of said ethylene/vinyl acetate copolymer to the total of (a) and (b) being 1:99 to 99:1.

13. A process of claim 1 wherein the suspension stabilizer is 0.1–1.0% by weight, based on the total weight of monomer of a methylcellulose having a methoxy substitution degree of 22–34% and a viscosity of 10–5,000 mPas, measured in a 2% aqueous solution (according to Brookfield at 20° C. and 20 rpm) or a methylhydroxypropylcellulose having a methoxy substitution degree of 20–32% and a hydroxy-propoxy substitution degree of 2–9% and a viscosity of 25–5,000 mPas, measured in a 2% by weight aqueous solution (Ubbelohde capillary viscometer at 20° C.).

14. A process of claim 13 wherein the amount of catalyst is 0.01–0.3% by weight, based on the total weight of monomer, and the polymerization is conducted at 30°–80° C.

15. A process for the production of a vinyl chloride polymer comprising, suspension polymerizing a corresponding monomer or monomer mixture, in the presence of a suspension stabilizer, an oil-soluble catalyst, an optional pH buffering system, and 0.4–5.0% by weight, based on the weight of monomer (a) of an ethylene/propylene/ethylidene norbornene terpolymer having a propylene content of 40–50% by weight, 5–15 double bonds per 1,000 carbon atoms and a viscosity of 4–20 mPas, measured on a 2% solution in trichloroethylene at 25° C.; or (b) of a polyvinyl isobutyl ether having a K value of 80–150, measured on a 0.5% solution in isooctane at 20° C.

16. A process of claim 15 further comprising, prior to the polymerization step, under agitation, adding the catalyst, the ethylene/propylene/ethylidene norbornene terpolymer or the polyvinyl isobutyl ether and the monomers to the polymerization batch before addition of the suspension stabilizer thereto.

* * * * *